United States Patent Office 2,859,767
Patented Nov. 11, 1958

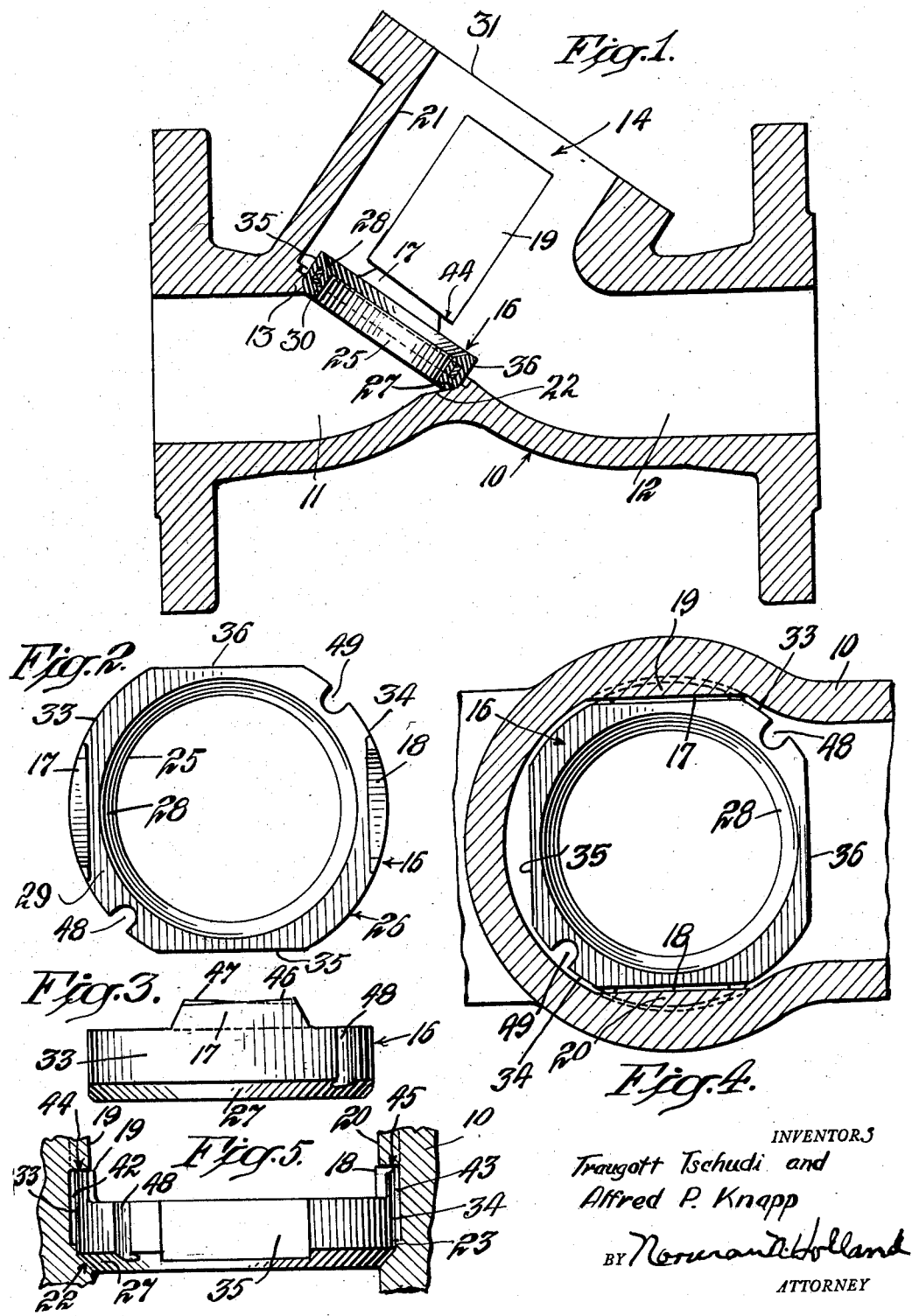

2,859,767

VALVE SEAT AND HOUSING

Traugott Tschudi, Flushing, and Alfred P. Knapp, Jackson Heights, N. Y., assignors to Knapp Mills Incorporated, Long Island City, N. Y., a corporation of New York Application April 13, 1953, Serial No. 348,529

2 Claims. (Cl. 137—315)

This invention relates to valve structures and particularly to a valve structure having a removable seat.

The object of the invention is to provide a combination of a special housing with a cooperating removable valve seat which will be adaptable to conventional type structures and at the same time simple in form, accurately guided into place for easy insertion and replacement and securely positioned and locked in place in the valve structure.

Further objects of the invention particularly in the details of the interchangeable valve seats will appear from the following drawings illustrating the invention and in which:

Fig. 1 is a sectional view of the housing and removable valve seat without the valve plug;

Fig. 2 is a top view of the removable valve seat;

Fig. 3 is a side view of the valve seat;

Fig. 4 is a top view of the removable valve seat locked in position in the housing; and Fig. 5 is another side view of the removable valve seat locked in position in the housing shown in section.

Referring to Fig. 1 the housing 10 has two passages 11, 12 with a valve seat mounting 13 between them and a valve chamber 14 extending normal to the valve seat mounting 13. The valve seat mounting has a valve seat against which a rubber or plastic valve plug (not shown) is sealed to block the flow of fluids from passage 11 into passage 12. The valve seat mounting and the valve seat are at an angle to the passages 11 and 12 and the valve seat 16 is fitted into the valve seat mounting 13 through the chamber 14 guided by the walls 21 of the chamber and the ribs 19, 20 protruding from the cylindrical surface. The valve seat turns when set in position and is held tightly in position by the lugs 17, 18 engaging the ribs 19, 20 on the wall 21 of the chamber.

The valve seat mounting 13 forms a bead around the inside of the housing and has a conical surface 22 and an annular surface 23 machined to receive the removable valve seat 16. The valve seat is preferably of lead with an internal steel ring for greater rigidity. The conical surface 22 faces towards the chamber 14 to form with the annular surface 32 a concave shaped surface to receive the valve seat. The valve seat 16 is ring shaped with an inner cylindrical opening 25 for passing fluids from passage 11 to passage 12 and an exterior cylindrical surface 26 fitting in part inside of the annular surface 23 to seat the conical surface 27 of the valve seat against the surface 22 of the mounting 13. A valve seating surface 28 of a conical shape is on the valve chamber side of the valve seat and faces the chamber 14 to form a surface for seating the plug (not shown) of the valve against and sealing the fluids from passing from one passage to another. The valve seat is preferably of a soft metal such as lead and a steel annular ring 30 is imbedded in the body of the valve seat to reinforce it. The plunger of the valve moves preferably axially from the valve seating surface 28.

The ribs 19, 20 may be diametrically opposed and raised or spaced apart a distance less than the walls 21 so that the chamber 14 and opening 31 have a generally oval or elliptical shape. The ribs 19, 20 extend from adjacent the opening 31 down the side of the chamber 14 and terminate above the valve seat mounting to form recesses 42, 43 between the valve seat mounting and the ribs 19, 20 as shown in Fig. 5. The valve seat 16 is also of a generally oval or elliptical shape and fits into the chamber 14 between the ribs 19, 20 and the walls 21. The exterior surface 26 has two cylindrically shaped surfaces 33, 34 and two diametrically opposed flat guide surfaces 35, 36. The guide surfaces are spaced apart a distance slightly less than distance between the ribs 19, 20 and the curved surfaces 33, 34 have a diameter greater than the distance between the ribs 19, 20 and less than the diameter of the annular surfaces 23. The valve seat is inserted through the valve chamber 14 with the side surfaces 35, 36 guided by the ribs 19, 20 respectively. The valve seat is turned in the mounting 13 to bring the curved portion 33, 34 into the recesses 42, 43 and the upstanding lugs 17, 18 underneath the ribs 19, 20, respectively, as shown in Fig. 4 and 5.

In Fig. 2 the lugs 17, 18 are on opposite sides of the valve seat between the cylindrical surfaces 33, 34 and the surface 28. The lugs are preferably positioned circumferentially ninety degrees to the guide surfaces 35, 36 so that when the valve is turned to lock in the seat the lugs will be under the ribs 19, 20. The lugs are face to face and project above the surface 29 between the surface 26 and conical seating surface 28. The lugs are wedge shaped with the top surfaces 46, 47 circumferentially inclined in the same direction.

The ribs 19, 20 have complement and beveled or wedged shaped surfaces 44, 45 extending circumferentially to engage the surfaces 46, 47 and wedge the valve seat in position. As the valve seat 16 is turned the surfaces 44, 45 are engaged by surfaces 46, 47 and forced to tightly secure the valve seat on the valve seat mounting.

In the cylindrical surfaces 33, 34 are the grooves or slots 48, 49 which are diametrically opposed extending from the surface 29 for receiving the prongs or bayonets of a locking tool. The grooves are spaced from the lugs so that on turning the valve seat to locking position the ribs 19, 20 will not interfere with the removal of the prongs from the grooves or slots.

It is thus seen that a valve seat is easily and readily replaced and removed. The flat surfaces may be aligned with the surface of the ribs and the valve seat dropped or lowered on to the valve seating mounting. The valve seat is then locked in position by inserting the prongs or bayonet of the locking tool into the grooves or slots and turning the valve seat so that the projects or lugs are wedged against the circumferentially inclined surfaces of the ribs. To remove the valve seat the prongs or bayonets of the locking tool are inserted into the slots and the valve seat turned to withdraw the lugs from underneath the ribs and the flat sides brought into alignment with the ribs and the valve seat lifted from the housing.

From the foregoing description it is seen that the present type valves and valve housing may be readily adapted to utilize the valve seat, valve seat mounting the guide ribs shown and described herein. The ribs 17 and 18 can be readily formed or cast into the wall 21 to be integral with the housing. The conical surface 22 is preferably at a fine degree angle and is easily accessible for machining through the opening 31 and chamber 14. The complementary conical surface 27 of the valve seat is at the same angle and is forced downward against the surface 22 to seal against the leakage. The steel ring 30 reinforces the valve seat making it more rigid and assists in the distribution of the pressure from the lugs around the valve seat.

The conical seat 28 is adapted to receive a neoprene rubber valve plug tightened down to seal the valve against high pressures.

Various modifications and changes may be made to adapt the valve seat and mounting and the ribs of the chamber to different types of housings without departing from the scope of the invention.

We claim:

1. A valve housing having a lengthwise elongated valve chamber with an opening at one end and a valve seat insert member seated on a valve seat mounting at the other end and the height of said insert member as compared to the distance of the upper face of said insert member from the opening in said elongated valve chamber being such that unaided insertion of said valve seat insert member to full engagement with said seat mounting is unlikely, and means comprising opposed flat guide ribs mounted within said valve chamber, elongated in the direction of the length of the chamber, and substantially coextensive with said length and terminating short of said valve seat mounting to provide shoulders forming locking surfaces therebeneath, and said valve seat insert member having a height greater than the distance of the top of said guide ribs from said opening in said valve chamber, opposed flat guide surfaces spaced complementarily to said elongated flat guide ribs, said valve seat member having opposed locking surfaces between said flat guide surfaces, said locking surfaces extending outwardly a distance greater than the distance between said flat guide ribs whereby said insert member is adapted to fit in said chamber only with said guide surfaces engaged with said guide ribs for sliding movement into seating engagement on said valve seat mounting and subsequent rotation to position said locking surfaces in locking engagement beneath said shoulders.

2. The combination as set forth in claim 1, wherein said locking portions on said valve seat are diametrically opposed lugs extending generally normal to the plane of said insert member and wherein the locking surfaces beneath said ribs and the portions on said insert member are inclined complementarily to each other to permit a tight fit between the two.

References Cited in the file of this patent

UNITED STATES PATENTS

| | | |
|---|---|---|
| 551,011 | Turnbull | Dec. 10, 1895 |
| 712,929 | Hedstrom | Nov. 4, 1902 |
| 1,257,011 | Morris | Feb. 19, 1918 |
| 1,570,681 | Kirkham | Jan. 26, 1926 |
| 1,768,562 | Brooks | July 1, 1930 |
| 1,805,158 | Bacon | May 12, 1931 |
| 2,606,718 | Mayo | Aug. 12, 1952 |

FOREIGN PATENTS

| | | |
|---|---|---|
| 4,895 | Great Britain | of 1895 |